United States Patent [19]

Hall

[11] 4,002,079
[45] Jan. 11, 1977

[54] BREATHING PROTECTOR BOOT FOR IMPACTOR TOOLS

[76] Inventor: William A. Hall, Rte. 1, Box 310-A, Anniston, Ala. 36201

[22] Filed: Aug. 27, 1975

[21] Appl. No.: 608,369

[52] U.S. Cl. .................................. 74/18.2; 173/76
[51] Int. Cl.² ........................................ F16J 15/50
[58] Field of Search ............... 74/18, 18.2; 173/76; 175/70; 417/439

[56] References Cited

UNITED STATES PATENTS

| 1,911,813 | 5/1933 | Decker | 173/76 |
|---|---|---|---|
| 3,266,581 | 8/1966 | Cooley et al. | 173/137 |
| 3,369,411 | 2/1968 | Hines | 74/18.2 |
| 3,391,646 | 7/1968 | Schlosser | 417/439 |

Primary Examiner—Samuel Scott
Assistant Examiner—Wesley S. Ratliff, Jr.
Attorney, Agent, or Firm—David H. Semmes

[57] ABSTRACT

An elastomeric protector boot for covering the lower housing of a hydraulically operated impactor tool characterized by air vents which are adapted to allow free air communication between the interior of the boot while preventing debris from entering the lower housing of the impactor. The protector boot further includes an internal foam rubber filter member for ensuring that foreign particles do not enter the annular space between the bit and the housing. The air vents are further protected from being snagged or torn through the provision of protection lobes which allow air communication between the air vent while preventing ingress of debris generated by operation of an impactor.

4 Claims, 3 Drawing Figures

U.S. Patent  Jan. 11, 1977  4,002,079
FIG. 2
FIG. 3
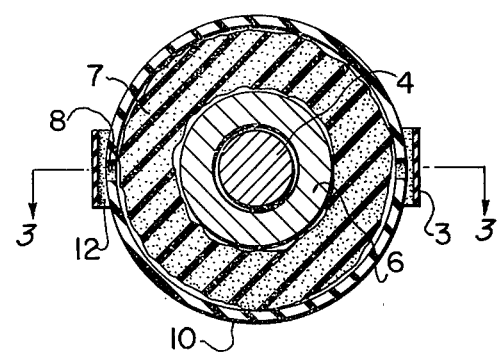
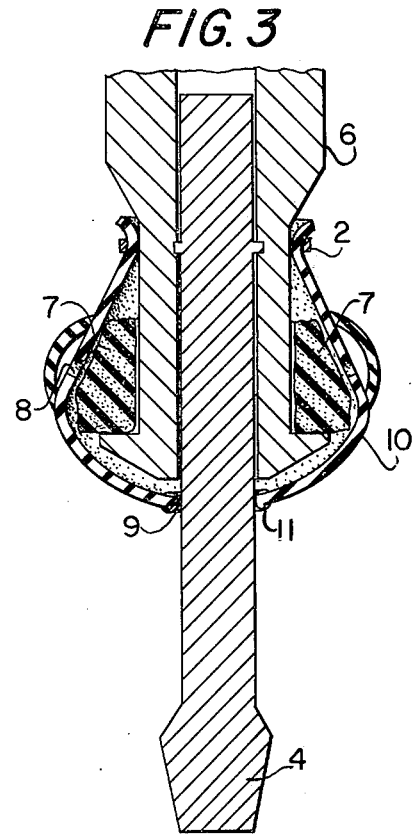
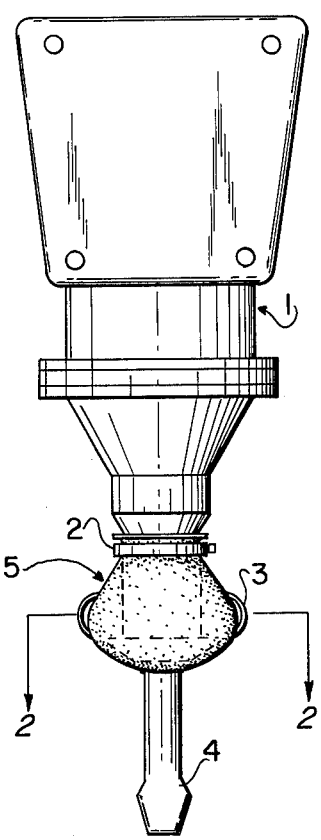
FIG. 1

BREATHING PROTECTOR BOOT FOR IMPACTOR TOOLS

BACKGROUND OF THE INVENTION

1. Field of the invention

Impactor tools are susceptible to damage when debris created during rock crushing and breaking operations enters the lower housing of an impactor bit through the annular space between the shaft of the breaker bit and the housing. Because of the oscillitory motion of the breaker bit, any guard to prevent particulate matter from being drawn in the the lower housing must be able to accommodate the oscillation of the bit without failure or interference to the operation of the bit.

There exists a need for an easily positioned protector boot for impactor tools which will accommodate various sizes of bits and be able to withstand the abuses of impactor operation and cool the impactor housing.

Machine tool devices commonly include protective accordian type boots between relatively moving parts for maintaining an environmental seal. However, the particularly severe operating conditions inherent in impactor operation requires a protective boot which will effectively withstand the extremely rapid oscillation of an impactor bit while being serviceable in the hostile enviornment in which such impactors are used.

Unlike the design considerations involved in simply covering relative moving parts with a flexible member, there exists a need for a protective boot which will withstand the rigors of impactor operation while facilitating changing of bits during use of an impactor.

To applicant's knowledge there is no presently available protective device which meets the requirements of durability and effectiveness which are realizable with the present invention.

2. Description of the Prior Art:

The following patents illustrate various prior art devices common in machine tool applications for simply sealing relatively moving members:

| | |
|---|---|
| WHISTLER | 2,883,243 |
| ETZKORN | 2,890,455 |
| COOLEY | 3,266,581 |
| HEITZ | 3,339,435 |
| BECKER | 3,598,192 |

Whistler illustrates a guide forming machine wherein an accordian-like tubular shield is used to maintain a bearing from outside contamination. The conventional type of shield of Whistler is not adaptable to the more rigorous requirements of impactor tool design, and is illustrative only of a non-vented covering not adaptable to impactor use.

The patent to Etzkorn is a nail-driving apparatus wherein a spring encloses a relatively moving member and affords a certain amount of shielding for an internally reciprocating rod. However, the wound spring of Etzkorn is unlike the present invention in that the spring is attached to two members which themselves are relatively immovable.

The patent to Cooley illustrates a type of buffer seal for an impactor device. However, in distinction to the present invention this buffer seal is an impact cushioning device with an internal member to maintain air pressure in a buffer chamber. The rigid compressible seal of Cooley is slideable on the movable hammer shaft and does not maintain a fixed connection on to the reciprocating shaft.

The patent to Heitz illustrates another accordian rubber shield in connection with a drilling machine. However, unlike the present invention the only sealing between the rotating shaft and the drill chuck is through a stationary annular seal which bears against the rotating drill shaft.

The patent to Becker illustrates a fluid tight casing seal for a rotary drill apparatus which allows fluid to pass external to a rotating bit shaft, and does not seal a reciprocating bit during oscillatory motion in an impactor housing.

Unlike these illustrative seals various types of machines in the prior art, the present impactor boot includes structural advantages to accomodate the peculiar problems associated with sealing the lower end of an impactor housing during impactor operation. None of the above references address the problems which are addressed and solved by the novel structure according to the instant invention as will be hereinafter more particularly explained.

SUMMARY OF THE INVENTION

The present invention provides a particularly efficient and adaptable impactor boot to protect the inner parts of an impactor tool from ingress of foreign materials. The impactor boot both covers the lower housing of the impactor while at the same time allowing ventilation of the lower end of the impactor boot to prevent overheating. As is well known, the lower end of an impactor includes intricately machined parts, including seals and bearing surfaces which are particularly susceptible to wear from rock particles which are allowed to enter. The rapid oscillatory motion of the breaker shaft requires a protective device which both effectively seals the annulus between the breaker shaft and the receiving bore of the impactor tool while allowing adequate ventilation to cool this region.

The present invention recognizes and solves the peculiar environmental problems involved in impactor devices by providing a distensible rubber boot which is securely clamped to the lower end of the impactor housing at the upper end, with a second lower opening for a distensible engagement with the rotating breaker bit. According to the instant invention the protective boot securely maintains engagement with the lower housing, as well as the breaker shaft with the oscillatory motion of the shaft pumping filtered air inwardly and outwardly through a venting means.

Because of the provision of a tight fitting beaded annular opening in the impactor boot, a breaker shaft is inserted into the impactor housing through the lower opening while distending the beaded surface sufficiently to maintain an effective seal between the lower opening in the breaker shaft. Because the boot itself is flexible, there is no relative movement between the reenforcing bead in the lower opening and the breaker shaft, thusly, there is no wear between the breaker shaft and the bead.

Since the elastomeric boot is a thin walled body, its flexing as a result of the movement of the bit shaft effectively induces an air flow through vent lobes, much in the manner of a lung.

Because of the distensible nature of the body of the protective boot, there is an effective exchange of air between the ambient and the interior of the body. To further ensure that no debris such as rock dust is ingested into the lower impactor housing, an annular filter collar of foam rubber or other porous elastomeric material is positioned within the boot resting upon the lower impactor housing flange between the impactor housing and the air vents. The air vents themselves are protected with a flexible lobe which ensures that the vents are not snagged or torn during operation.

Moverover, other features, objects and advantages of the invention will become apparent by reference of the following detailed description of the preferred embodiment and the drawings.

BRIEF DESCRIPTION OF THE DRAWINGS:

FIG. 1 is a plan view of a protective boot according to the invention installed on the lower impactor housing.

FIG. 2 schematically illustrates a horizontal sectional view of FIG. 1;

FIG. 3 schematically illustrates a further vertical sectional view of FIG. 2 illustrating positioning of the various components.

DESCRIPTION OF THE PREFERRED EMBODIMENT:

Referring now to the drawings the impactor boot according to the present invention is a thin wall elastomeric material, such as vulcanized rubber which has a vertical axis of symmetry. The boot is a composite structure denoted generally as 5 in FIG. 1 and includes an upper flanged surface with a clamp for positioning the boot around the lower end of an impactor housing, generally designated as 2. A particularly advantageous feature of the impactor boot is the provision of an aperture means 3 which includes an air vent 8 covered over by a vertically extending elastomeric covering which allows ambient air to horizontally enter and communicate with the interior of the boot through the air vents. The horizontal openings as shown at 12 in FIG. 2 ensure that the air vents 8 are not susceptible to being snagged or torn during operation.

While the particular shape to the boot may be modified, it is found to be particularly advantageous to employ a bulb shaped cross-section around a vertical axis of symmetry as shown in FIG. 3. The bulb shape includes a rounded lower contour 10 and a conical upper contour terminating in a upper annular surface which has a horizontally projecting flange adapted for engagement with the clamp at 2.

In order to maintain the lower contour of the boot in engagement with the rapidly oscilating breaker shaft, a lower horizontal annular mounting surface is defined at 9 to be distended by insertion of a bit into the impactor housing. As shown most clearly in FIG. 3 the lower annular opening includes a reinforcing bead designated 11 to ensure a stationary positioning of the rubber boot on the breaker shaft 4 after its initial insertion in the impactor housing 6. Because the opening illustrated at 9 may be conventionally a one inch diameter hole for acceptance of a breaker shaft 4 which may be 1⅞ inches in diameter, the insertion of the breaker bit through the beaded opening 9 distends this opening while thinning out the bead 11. The insertion of the bit is vertically upwards into the lower impactor housing, and the subsequent amplitude of oscilation is bi-directional so that the distended reinforcing ring is able to maintain a fixed position onto the breaker shaft during the operation and thus effectively preventing debris from entry past the lower opening and into the lower impactor housing.

In order to ensure that the pumping action of the boot does not result in foreign matter being ingested through the openings 8, a foam rubber filter collar, or other type of porous elastomeric filtering media is shown at 7. As a result of the distension of the entire lower rounded contour of the boot during oscilation of the breaker bit air that is inwardly pumped through vents 8 is filtered when the lower contour is pulled downwardly during the intake cycle. The foam rubber collar 7 will contact the inner wall of the conical upper contour of the boot during the downward travel of the bit so that the increased volume inside the boot which induces ambient air flow inwardly is ensured to pass through the filtering medium 7. Upon the upward stroke of the impactor bit the inner wall is allowed to extend away from the filtering medium so that trapped cooling air which is forced outwardly through the vents 8 may also pass around the filtering medium to ambient.

The protective lobe protector designated 3 at FIG. 3 in the preferred embodiment is a vertically attached elastomeric member which allows an air space at 12. According to a preferred embodiment the air space 12 would be ⅛ inch and the width of the lobe 3 would be 2 inches to cover the ¾ inch air vent at 8.

The air ventilation holes 8 themselves may be located in a vertical crease of the protector boot to further avoid frictional damage that might be created during impactor operation. The boot itself including the lobes may be of a thin walled cast rubber or elastomer wherein the walls may be preferably of a ¼ inch thickness. It has been found that the breathing protector boot according to the instant invention may have a diameter of approximately 8 inches which, as illustrated in FIG. 1 is substantially the same order of magnitude as the diameter of most lower housing means in impactor devices, as schematically illustrated at 1.

While one embodiment of the invention has been illustrated and described, it is to be understood that certain changes and additions can be made by those skilled in the art without departing from the scope and spirit of the invention which it is solely limited by the appended claims.

I claim:

1. An air-vented boot adapted for protecting the lower housing of an impactor tool comprising in combination:
    A. A thin-walled symmetrical elastomeric body having a vertical axis or revolution, and further including:
    B. An upper annular surface defining a first horizontal disposed opening in said body adapted to be clamped around the lower end of an impactor housing, and a lower annular surface defining a second horizontally disposed opening and adapted to be distensibly engaged around, and against relative movement to, the shaft of an impactor bit; and,
    C. Aperture means defining at least one air vent through the wall of said body between said first and second openings, said aperture means including a protector lobe formed external to, and in partial encompassing relation over, said air vent opening in said body whereby said air-vented boot is operable to pump an air flow within and without said boot during oscillation of said breaker bit.

2. The air-vented boot as in claim 1 further including a porous elastomeric filter collar disposed within said body proximate said air vent opening in said body, said filter collar adapted to be maintained between the lower end of an impactor housing and the inner wall of said body.

3. The air-vented boot as in claim 1 further including a reinforcing bead formed within said lower annular surface defining said second opening.

4. The air-vented boot according to claim 1 wherein said thin walled symmetrical elastomeric body is bulb-shaped having a rounded lower contour and a conical upper contour, said aperture means being upon said conical upper contour.

* * * * *